(12) United States Patent
Aller et al.

(10) Patent No.: US 11,863,015 B2
(45) Date of Patent: Jan. 2, 2024

(54) NETWORKED LIGHTING DRIVER INCORPORATING A PHYSICAL NEGOTIATED LINK LOSS MODE

(71) Applicant: Innovative Lighting, LLC, Roland, IA (US)

(72) Inventors: Harry Aller, Indianola, IA (US); Jerrold Handsaker, Roland, IA (US)

(73) Assignee: Innovative Lighting, LLC, Roland, IA (US)

( * ) Notice: Subject to any disclaimer, the term of this patent is extended or adjusted under 35 U.S.C. 154(b) by 213 days.

(21) Appl. No.: 17/194,826

(22) Filed: Mar. 8, 2021

(65) Prior Publication Data

US 2021/0281106 A1 Sep. 9, 2021

Related U.S. Application Data

(60) Provisional application No. 62/986,084, filed on Mar. 6, 2020.

(51) Int. Cl.
*H02J 9/06* (2006.01)
*H05B 47/105* (2020.01)
*F21S 9/02* (2006.01)
*F21Y 115/10* (2016.01)

(52) U.S. Cl.
CPC ............... *H02J 9/065* (2013.01); *F21S 9/022* (2013.01); *F21Y 2115/10* (2016.08)

(58) Field of Classification Search
CPC .. H05B 45/00; H05B 45/3725; H05B 47/185; H02J 9/04; H02J 9/06; H02J 9/065; H04L 12/10; F21S 9/022; F21Y 2115/10
See application file for complete search history.

(56) References Cited

U.S. PATENT DOCUMENTS

| | | | |
|---|---|---|---|
| 2016/0273722 A1* | 9/2016 | Crenshaw | H02J 7/0047 |
| 2017/0023193 A1* | 1/2017 | Thosteson | F21V 23/003 |
| 2018/0228007 A1* | 8/2018 | Siefer | H05B 47/18 |
| 2018/0249556 A1* | 8/2018 | Wendt | H04L 12/12 |

OTHER PUBLICATIONS

IEEE 802.3.*

* cited by examiner

*Primary Examiner* — Henry Luong
(74) *Attorney, Agent, or Firm* — Westman, Champlin & Koehler, P.A.

(57) ABSTRACT

A networked driver for a powered device (PD) includes an input connection capable of receiving power and data from an external power and data source, one or more output connections capable of supplying power and data to the PD, and a circuit capable of initiating delivery of a predetermined amount of power to the external load when a physical negotiated link between the external power and data source is lost.

17 Claims, 3 Drawing Sheets

NETWORKED LIGHTING DRIVER INCORPORATING A PHYSICAL NEGOTIATED LINK LOSS MODE

CROSS-REFERENCE TO RELATED APPLICATION

The present application is based on and claims the benefit of U.S. provisional patent application Ser. No. 62/986,084, filed Mar. 6, 2020, the content of which is hereby incorporated by reference in its entirety.

BACKGROUND

Deployed lighting fixtures are routinely required to provide a predetermined amount of light to the space which they occupy in the event of an emergency or loss of electricity to the building.

Legacy lighting systems routinely rely on localized battery backup devices that will be activated in the event power to the building is lost. This method is widely accepted in smaller buildings but is challenging to install and maintain in larger ones.

In larger buildings, it is desirable to centralize the power backup devices. Doing so eliminates the need for complicated light fixture installations and typically results in cost savings for the building owner.

In smaller or larger buildings, legacy lighting systems are designed and installed with a circuit methodology. Turning on a switch or triggering a relay will close the circuit, causing power to flow which results in illumination.

In contrast, a networked lighting system always has power flowing, such as to a network switch, or power supply selectively controlled by the switch. Whether a fixture is illuminated or not is determined by control signals sent from a control device through wireless or wired means.

The deployment of such systems has raised questions on how best to trigger illumination safely and reliably in the event of an emergency or loss of building power as the circuit-based approaches of the past do not apply.

As with all legacy backup or emergency lighting systems, maintenance is costly, and reliability is key. Due to the reliability demands of emergency lighting, rigorous testing is required. Testing of emergency lighting in legacy lighting deployments typically relies on someone pressing a test button near the luminaire and recording the results of a proper transition to emergency power. With larger buildings requiring thousands of emergency luminaires, this testing process is time consuming and therefore costly.

Networked lighting systems that utilize Power Over Ethernet (PoE) technology are increasing in popularity. These systems are advantageous as both low-voltage power and data are supplied over a single Category (Ethernet) cable to the fixtures. This delivery method has been proven to be more efficient, easier to install and enables the light fixtures to be controlled easily.

SUMMARY

In one embodiment, a Power over Ethernet lighting driver is connected to Power Sourcing Equipment by way of an Ethernet cable. The output of the driver is connected to a luminaire or other PoE lighting fixture. Upon a disruption of a physical negotiated link between the driver and power sourcing equipment (i.e., a network switch), the driver will supply a predetermined amount of power to the luminaire resulting in illumination necessary during a power outage or emergency.

In another embodiment, a PoE intelligent lighting driver is connected to Power Sourcing Equipment by way of an Ethernet cable. The output of the intelligent driver is connected to a luminaire. Upon a disruption of a physical negotiated link, the intelligent driver supplies a predetermined amount of power to the luminaire resulting in illumination necessary during a power outage or emergency and additionally recording the time at which the physical negotiated link was lost. Upon reestablishment of the physical negotiated link, the intelligent driver resumes normal operation along with recording the time and the amount of power consumed by the connected luminaire. The intelligent driver in one embodiment at this time reports these recorded results to a centralized system for further verification and validation.

In another embodiment, a networked driver for a powered device (PD) includes an input connection capable of receiving power and data from an external power and data source, one or more output connections capable of supplying power and data to the PD, and a circuit capable of initiating delivery of a predetermined amount of power to the external load when a physical negotiated link between the external power and data source is lost. In one embodiment, the input connection is a Universal Serial Bus (USB) connection.

In another embodiment, a power over Ethernet (PoE) lighting system includes power sourcing equipment (PSE) having a midspan configured to receive power from an external power source in normal operation, and a network switch configured to receive power from the external power source in normal operation, a PoE powered luminaire, and a driver coupled between the midspan and the luminaire to receive power and data from the midspan and deliver power and data to the luminaire. The network switch is configured to provide a physical negotiated link between the network switch and the driver via the midspan.

A method of operating power over Ethernet (PoE) device including monitoring a physical negotiated link between a network driver and a power source; and in the event the physical negotiated link is lost, initiating power delivery to the PoE device to turn the PoE device on to an emergency operation mode.

DETAILED DESCRIPTION

Figure 1:
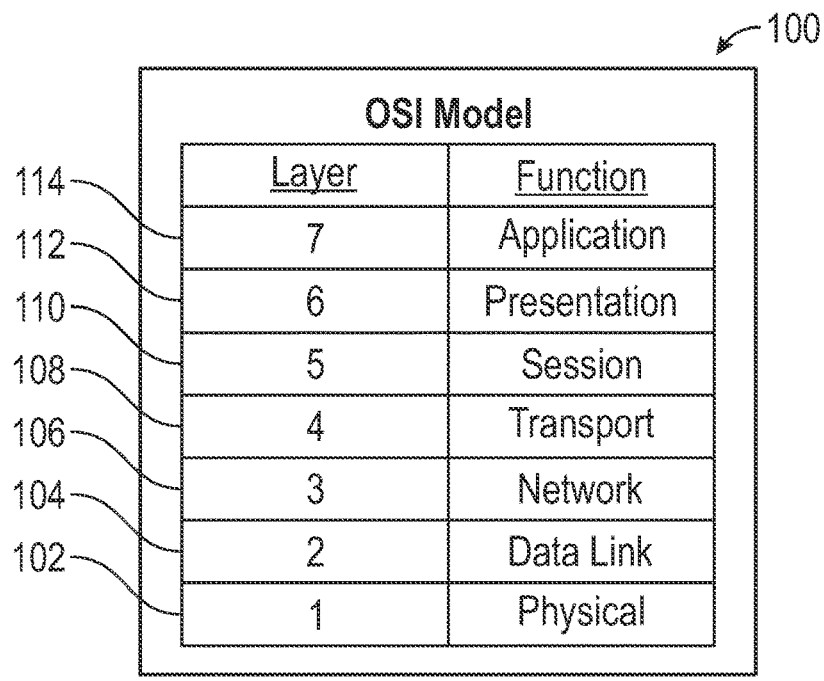
FIG. 1 is a table showing an Open Systems Interconnection (OSI) model.

Communication networks are built upon a conceptual model known as the Open Systems Interconnection (OSI) model 100 as shown in rough layer form in FIG. 1. The OSI model 100 describes the functions of a communication system without knowledge of its intended use or purpose. The OSI model 100 is broken up into seven layers 102, 104, 106, 108, 110, 112, and 114 as is known in the art.

Each of the seven layers of the OSI model serve a purpose, as is known in the art. As Ethernet communications are concerned, the Physical Layer, Layer 1, is responsible for the physical connection (i.e. cabling) along with the negotiated parameters (i.e. speed) used in communicating between devices. The remaining layers are responsible for managing the flow of data being transmitted on top of the Physical Layer.

All electronic devices require power in some form to operate. In the case of a Power over Ethernet (PoE) Lighting System, power to a powered device (PD) is supplied from a Power Sourcing Equipment (PSE) via a Category (Ethernet) cable to the PD.

The PSE is responsible for providing power and data to its connected devices. A PSE can be one or more pieces of equipment. A PoE Network Switch is typically a single piece of hardware with the components needed to supply power and data. In contrast, a PSE can also be two pieces of hardware; a Network Switch and a Midspan. In this case, the Network Switch is responsible for the handling of data and the Midspan is responsible for injecting power on top of the data. In both cases, the power and data are transmitted together along the same Ethernet cable to the PD.

Most PSEs obtain their power from a typical electrical system, i.e. high-voltage AC power from the building. This is considered a primary power source.

Some PSEs support the connection of a secondary power source, i.e. a battery pack. These secondary sources provide power in the event the primary power source is unavailable. These methods ensure the PDs continue to operate in some fashion.

A physical negotiated link is a link between a driver and a network switch, established by communication between the components. The physical negotiated link is a communication link with determined communication protocols for speed of communication and uni- or bi-directional communication capabilities between the two physical devices of the link. In one embodiment of the disclosure, the devices are a network switch and the driver. The negotiation can be an autonegotiation, or a directed negotiation with specific protocols.

If at any time the data portion of the network switch is interrupted, and as long as the switch is still providing raw power, the node (the intelligent driver) sees that and defaults to emergency conditions, in this case turning emergency lighting on, overriding the normal operation of the lighting.

PoE lighting requires both power and data for normal operation. Power is required to drive the control circuitry and ultimately the Light Emitting Diodes (LEDs). Data is required for control. Using data packets, the lighting system can instruct the networked lighting driver to turn on, off, dim and even adjust the color of the luminaire. Many advanced functions are also possible with the integration of connected sensors including, but not limited to daylight harvesting, occupancy and vacancy detection, temperature reporting and circadian rhythm functions.

Building and occupancy codes require lighting systems to provide illumination in a power outage event and in some cases, emergencies. In the case of UL924, luminaires responsible for emergency lighting are required to provide illumination for a minimum of ninety minutes in the event of an electrical failure.

Figure 2A:
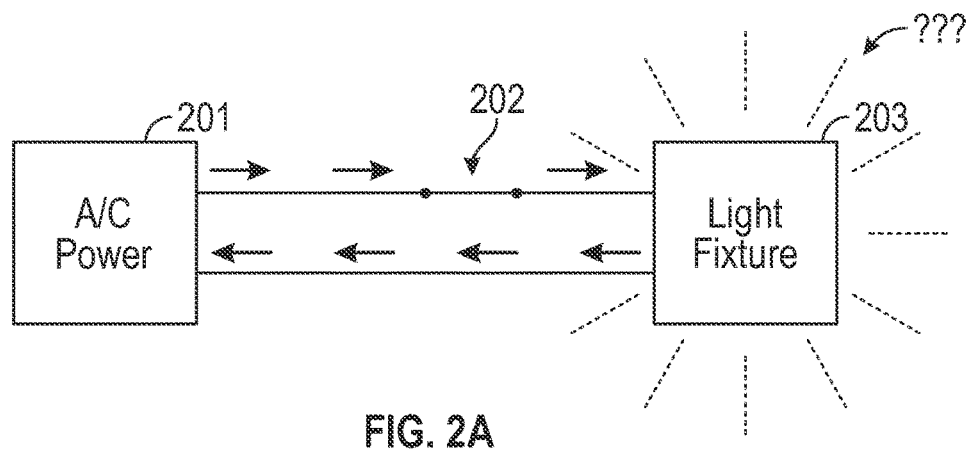
FIGS. 2A and 2B are block diagrams showing legacy, circuit-based lighting topologies.

With legacy lighting systems, most are based on a circuit methodology such as that shown in block diagram form in FIG. 2A. In this case, a switch 202 is turned on allowing the flow of power from power source 201 to the connected luminaire 203. While power is flowing, the luminaire 203 illuminates.

Figure 2B:
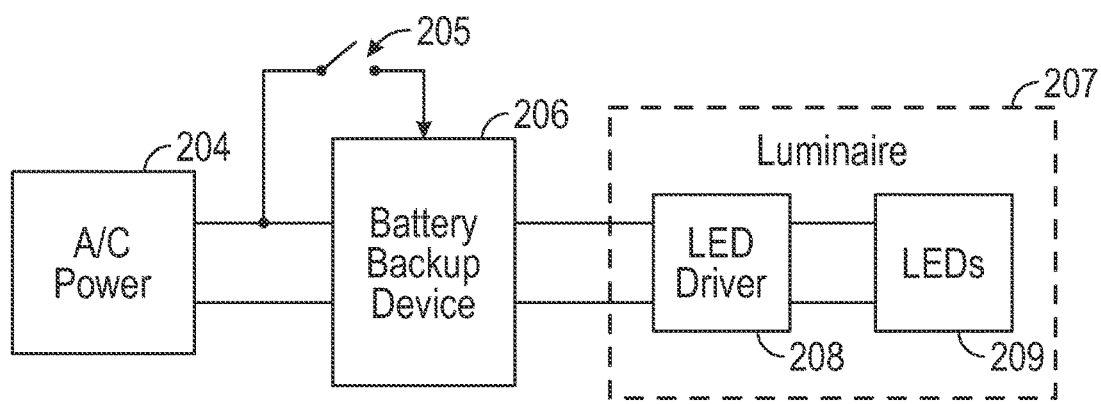

FIG. 2B shows another legacy lighting system utilizing battery backup devices 206 between the power 204 and the luminaire 207. In this system, a switch 205 is coupled between the battery backup device 206 and power 204 so that when power is available at the power source 204, power is supplied therethrough. The backup unit 206 senses a loss of building power 204 by monitoring a power connection. If the primary power source 204 fails, the battery unit 206 begins sending stored power to the luminaire 207 until the primary power source 204 is once again available.

While smaller buildings use backup units near the luminaire, larger buildings utilize centralized emergency power systems. While effective, these too are based on a circuit methodology. In both cases, these legacy lighting systems lack the functionality a PoE Lighting System can provide.

Unlike circuit based, legacy lighting systems, PoE Lighting Systems always have power flowing to a networked driver responsible for controlling a luminaire. Therefore, the mere presence of power to the networked driver will not allow triggering emergency illumination on a switch to auxiliary or backup power, as power is already flowing to the networked driver. As such, the need for data communication across the network is required to trigger the networked driver. In the event of a power outage or emergency, this is not always possible as the network may not be viable.

Some smaller PoE lighting deployments are utilizing battery backup devices at the luminaire. While functional, they are not appropriate for larger buildings as their deployment and management is complicated and costly.

Some networked lighting deployments have utilized a timeout method in which if the networked driver loses bi-directional communication with a central controller for a defined period, the networked driver will then engage the power output to the luminaire. While this eventually results in supply of emergency lighting, this not ideal as it is not immediate as it relies on a timeout period elapsing. Furthermore, false power outage positives can be realized by the networked driver if maintenance on the central controller is performed, resulting in unintended illumination.

Embodiments of the present disclosure provide a methodology and structure in which a PoE Lighting System, through the monitoring of a physical negotiated link, immediately illuminates a luminaire in the event of a primary power outage or other emergency condition. Furthermore, the same methodology can be deemed useful in the event of a network communication failure.

As mentioned herein, the Ethernet Physical Layer (layer 102 of the OSI 100) is responsible for providing the physical negotiated link (e.g., the connection) between the PSE and the PD. This physical connection is responsible for the delivery of power and negotiating a physical link wherein the PSE and PD have established connection parameters relating to speed and unidirectional or bidirectional communication capabilities of both devices.

In one embodiment, through the monitoring of the physical negotiated link, the networked driver is designed such that in the event the physical negotiated link is lost, the networked driver immediately initiates power delivery to the luminaire in an emergency lighting mode, resulting in illumination of the space.

Figure 3:
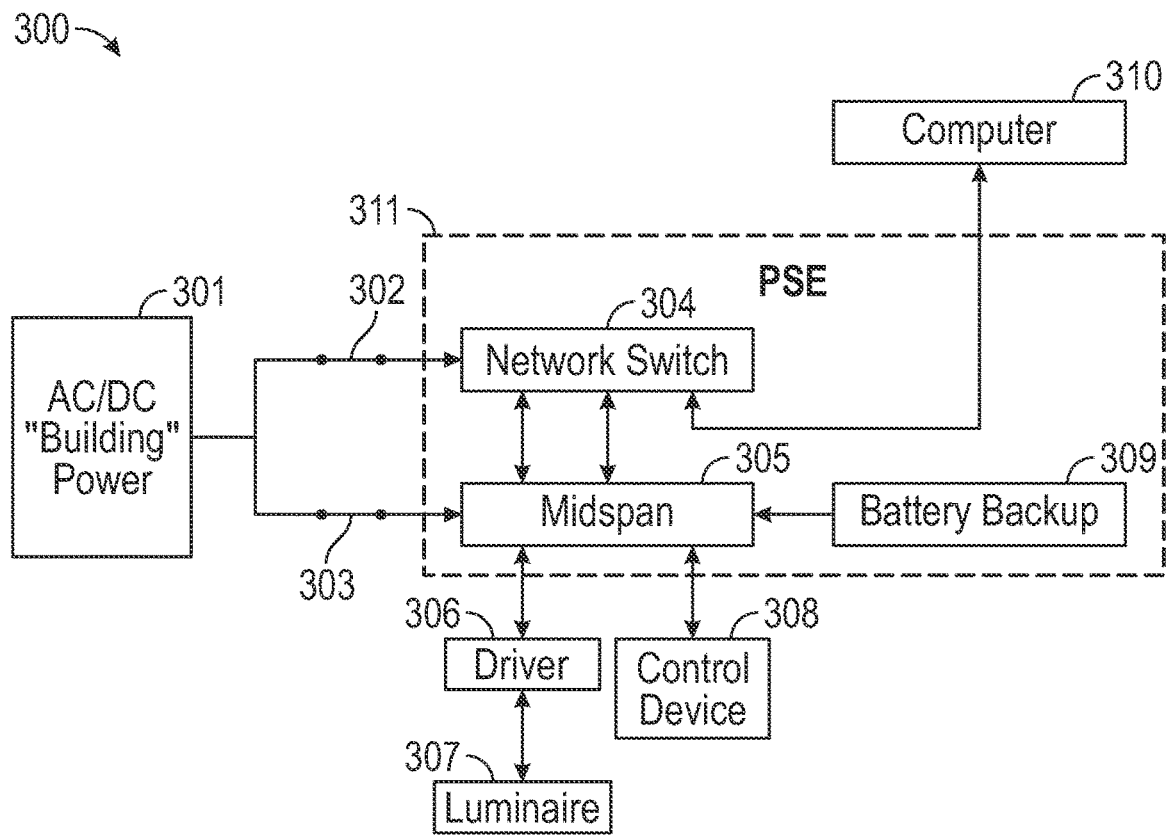
FIG. 3 is a block diagram showing an embodiment of a PoE Lighting deployment utilizing a PSE configuration consisting of a network switch, midspan and battery backup.

FIG. 3 shows a PoE lighting system deployment 300 according to one embodiment. In this scenario, power is provided by a midspan 305 to a networked driver 306.

Power to the midspan is provided either by building power 301 or battery backup 309. In the event the building power 301 is lost, both the network switch 304 and the midspan 305 lose their primary power source. In this case, the midspan 305 has a battery backup 309 as a secondary power source. Normally, the networked driver 306 will not notice any change as the midspan 305 immediately supplies stored power to the networked driver 306.

In this embodiment, the power is being supplied by the midspan 305, but the physical negotiated link between the network switch 304 and the driver 306 is being provided by the network switch 304. With the network switch 304 losing power, the networked driver 306 detects the loss of the physical negotiated link and initiates flow of power for emergency lighting to the luminaire 307 immediately. PSE 311 components in various embodiments may be programmed or otherwise controlled by using a computer 310 or other control device 308.

Figure 4:
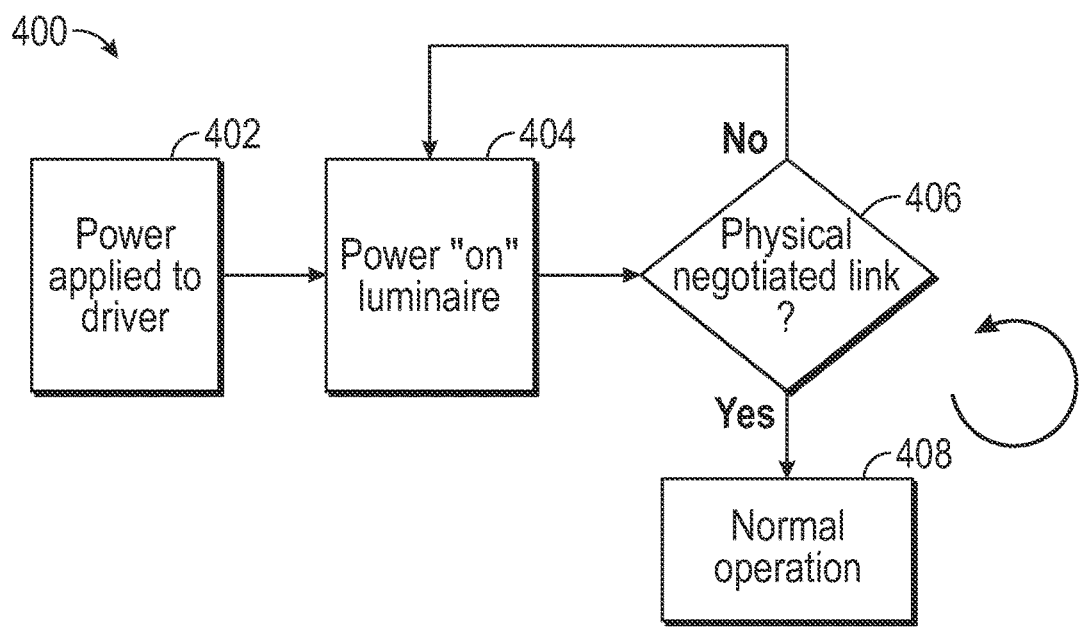
FIG. 4 is a state diagram of states of the embodiment of FIG. 3.

Upon the return of the building power, the networked switch 304 reboots, and upon a restoration of the physical negotiated link with the networked driver 306, the system returns to normal operation. A state diagram for operation of this embodiment is shown in FIG. 4. Provided the driver has power as shown in block 402, and a physical negotiated link is present between the driver and the network switch as determined in block 406, operation is normal as shown in block 408. If the physical negotiated link is detected by the driver as lost as shown in block 406, the driver switches the luminaire on a shown in block 404. Loss of the physical negotiated link results in emergency operation that overrides normal operation, and it occurs immediately since the system still has power, whether that power is building power or backup power, or power supplied by a midspan or directly.

Figure 5:
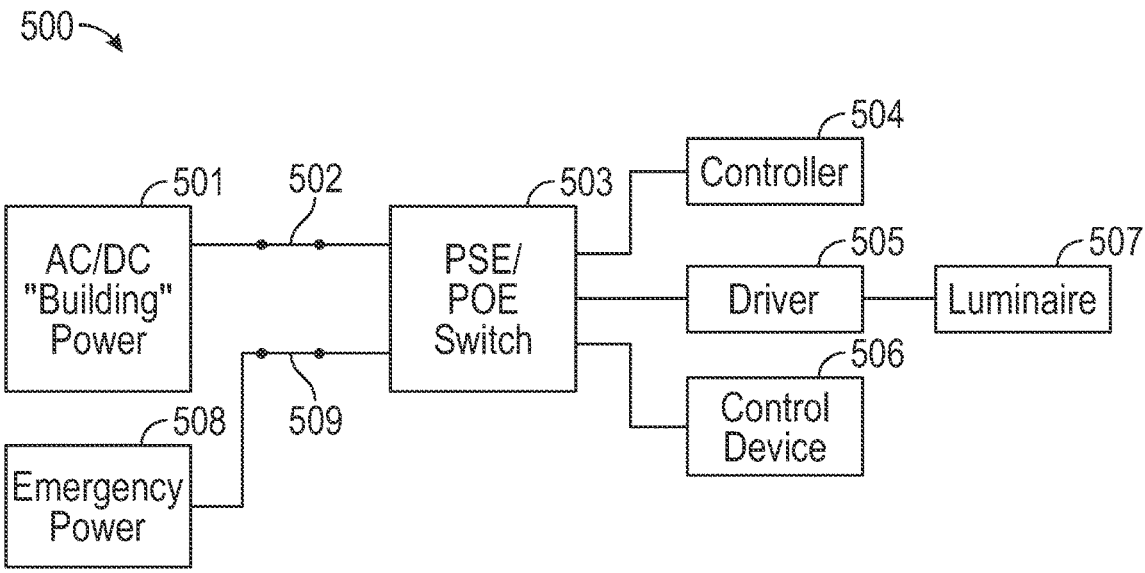
FIG. 5 is a block diagram showing an embodiment of a PoE Lighting deployment.

FIG. 5 shows a different lighting system embodiment 500. In this embodiment, power and data is provided by a PSE/PoE switch 503. As in many cases, larger PoE switches are used in networked lighting deployments and have multiple power supplies for flexibility and redundancy. Through proper assembly, the building power 501 may be connected to one power supply of PSE/PoE switch 503, and may be switched manually or automatically at switch 502. The emergency power source 508 may be connected to a second power supply of PSE/PoE switch 503, and may be switched manually or automatically to emergency power at switch 509. In this embodiment, when the building power 501 is lost, the PSE/PoE switch 503 sources its power from the emergency power source 508. The PSE/PoE switch 503 is configured in another embodiment to sever or momentarily drop its physical negotiated link with the networked driver 505 in this scenario, resulting in the networked driver 505 sending power to the luminaire 507 under emergency lighting conditions. PSE/PoE switch 503 in various embodiments may be programmed or otherwise controlled by using a computer 504 or other control device 506.

Figure 6:
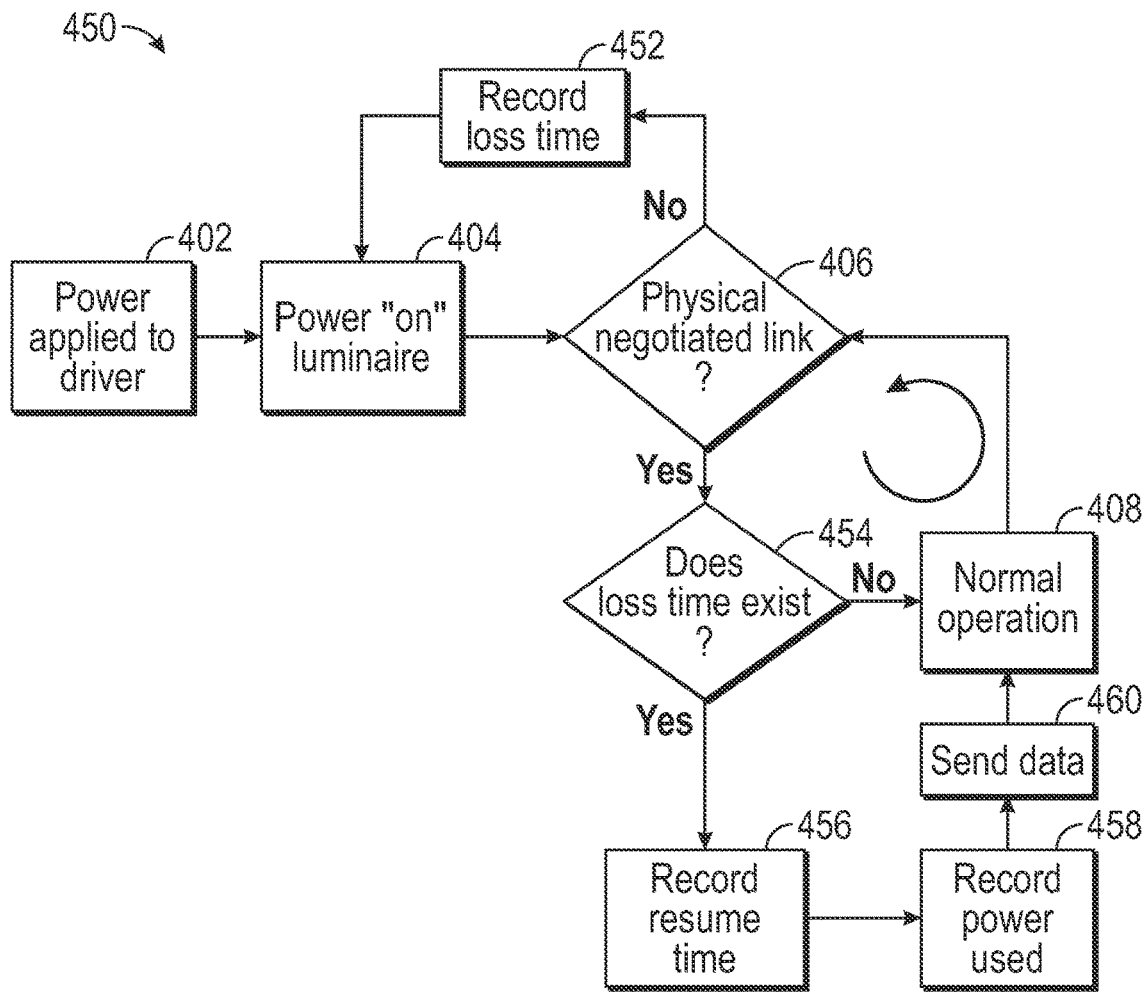
FIG. 6 is a state diagram/flow chart of a method of operating a system such as that shown in FIG. 5.

FIG. 6 expands on the methodology shown prior. In this process, the time at which the physical negotiated link is lost will be recorded by the networked driver. Upon the return of the physical negotiated link, the time will be recorded again along with the amount of power supplied to the luminaire during the outage by the networked driver. This data can then be sent to a central system for verification, validation and logging.

A state diagram 450 for operation of the embodiment 500 is shown in FIG. 6. As with the state diagram of FIG. 4, provided the driver has power as shown in block 402, and a physical negotiated link is present between the driver and the network switch as determined in block 406, operation is normal as shown in block 408. If the physical negotiated link is detected by the driver as lost as shown in block 406, the driver switches the luminaire on a shown in block 404. Additional processes occur in a system such as system 500 as shown in state diagram 450, although it should be understood that the additional processes may also be used with other embodiments of the present disclosure without departing from the scope thereof.

When a physical negotiated link is lost as indicated, the time that the signal is lost is recorded at 452. When the physical negotiated link is restored as indicated in block 406, a check is made at block 454 as to whether a loss time has been recorded. If no, normal operation continues at 408. If a loss time has been recorded, a time of restoration of the negotiated physical link is recorded at 456, an amount of power used during the low time from the time recorded at 452 to the time recorded at 456 is determined at block 458, data corresponding to the loss time frame and the recorded power consumption is stored or sent for processing at 460, and normal operation is initiated at 408. All of the states and the process of FIGS. 4 and 6 may be performed in one embodiment automatically according to programming of the operation of the various deployments such as but not limited to those shown in FIGS. 3 and 5.

In the embodiments of the present disclosure, a loss of the physical negotiated link results in emergency operation that overrides normal operation. This emergency operation is initiated immediately as long as the system still has power, whether that power is building power or backup power, or power supplied by a midspan or directly. It should be understood that determination of the loss of the physical negotiated link may be by any process, including use of a microprocessor, or through a series of logic gates without any microprocessor, as will be understood by those of ordinary skill in the art. As long as loss of the physical negotiated link is detected, then any process which initiates emergency operation of the lighting is well within the scope of one skilled in the art.

What is claimed is:

1. A system for providing power to an external load, comprising:
    a network driver having an input connection capable of receiving power and data from an external power and data source through a power sourcing equipment (PSE), and one or more output connections capable of supplying power and data to the external load; and
    the PSE, coupled between the external power and data source and the network driver, the PSE capable of immediately initiating delivery of a predetermined amount of power to the external load via the network driver when loss of a physical negotiated link, comprising a communication link with determined communication protocols for speed of communication and uni- or bi-directional communication capabilities between a network switch of the PSE and the network driver, occurs.

2. The system of claim 1, wherein the power supplied by the PSE between the external power and data source and the network driver is managed by a midspan device of the PSE.

3. The system of claim 1, wherein the external load is a luminaire.

4. The system of claim 1, wherein the input connection is a Power Over Ethernet (PoE) connection.

5. The system of claim 1, wherein the input connection is a Universal Serial Bus (USB) connection.

6. The system of claim 1, and further comprising:
a control device configured to, in the event of a loss of the physical negotiated link, record a time at which the physical negotiated link was lost, a time the physical negotiated link resumes, and an amount of power consumed by the external load during the loss of the physical negotiated link.

7. The system of claim 6, wherein the control device is configured to provide a packet of data containing the data collected during the loss of the physical negotiated link to an external computer for verification, validation and logging.

8. A power over Ethernet (PoE) lighting system, comprising:
power sourcing equipment (PSE) comprising a midspan configured to receive power from an external power source in normal operation, and a network switch configured to receive the power from the external power source in the normal operation;
a PoE powered luminaire; and
a driver coupled between the midspan and the luminaire to receive power and data from the midspan and deliver power and data to the luminaire;
wherein the network switch is configured to provide a physical negotiated link between the network switch and the driver via the midspan;
wherein the physical negotiated link comprises a communication link with determined communication protocols for speed of communication and uni- or bi-directional communication capabilities between the driver and the network switch; and
wherein the driver is configured to monitor the physical negotiated link, and to instruct the driver to light the luminaire immediately upon loss of the physical negotiated link.

9. The PoE lighting system of claim 8, wherein the driver is further configured to initiate emergency operation of the luminaire upon detection of a loss of the physical negotiated link.

10. The PoE lighting system of claim 9, wherein upon detection of the loss of the physical negotiated link, the driver draws power from the midspan.

11. The PoE lighting system of claim 10, wherein the PSE further comprises a battery backup coupled to provide power to the midspan upon request thereof.

12. The PoE lighting system of claim 11, wherein the midspan provides the power to the network driver on loss of the physical negotiated link from its external power source, or if the external power source is lost, through the battery backup.

13. The PoE lighting system of claim 12, and further comprising:
a control device configured to, in the event of the loss of the physical negotiated link, record a time at which the physical negotiated link was lost, a time the physical negotiated link resumes, and an amount of power consumed by the external load during the loss of the physical negotiated link.

14. A method of operating power over Ethernet (PoE) device, comprising:
monitoring a physical negotiated link, comprising a communication link with determined communication protocols for speed of communication and uni- or bi-directional communication capabilities between a network driver and a network switch;
in the event the physical negotiated link between the network driver and the network switch is lost, initiating power delivery to the PoE device to turn the PoE device on to an emergency operation mode.

15. The method of claim 14, wherein the network driver immediately overrides normal operation of a luminaire coupled to receive power and data from the network driver to provide emergency lighting upon loss of the physical negotiated link.

16. The method of claim 15, wherein the network driver reverts to normal operation of the luminaire upon reestablishment of the physical negotiated link.

17. The method of claim 14, wherein power delivery is provided by a battery backup on loss of the physical negotiated link.

* * * * *